United States Patent [19]

Belknap

[11] Patent Number: 4,870,730

[45] Date of Patent: Oct. 3, 1989

[54] TOOL MOUNTING CONSTRUCTION

[76] Inventor: John C. Belknap, 1740 Amherst St., Buffalo, N.Y. 14214

[21] Appl. No.: 107,650

[22] Filed: Oct. 13, 1987

[51] Int. Cl.[4] ........................ B23B 39/00; B23B 45/14

[52] U.S. Cl. ........................................ 29/26 A; 173/36

[58] Field of Search ................. 408/16, 716; 29/26 A; 173/39, 36, 37

[56] References Cited

U.S. PATENT DOCUMENTS

| | | | |
|---|---|---|---|
| 2,080,345 | 5/1937 | Stovall | 51/170 |
| 2,300,643 | 11/1942 | Bostwick et al. | 51/135 |
| 2,381,102 | 8/1945 | Boyd | 408/127 X |
| 2,405,110 | 8/1946 | Bullock | 173/36 X |
| 2,643,088 | 6/1953 | Hornack | 173/36 X |
| 2,722,812 | 11/1955 | Golasky | 408/127 X |
| 2,747,421 | 5/1956 | Thiel | 74/242.15 |
| 2,843,361 | 7/1958 | Miller | 173/36 X |
| 2,917,953 | 12/1959 | Badali | 173/36 X |
| 3,345,021 | 10/1967 | Gransten | 173/36 X |
| 3,369,328 | 2/1968 | Freerks et al. | 51/216 |
| 3,455,212 | 7/1969 | Judd | 173/36 X |
| 3,776,319 | 12/1973 | Richter | 173/36 |
| 3,948,005 | 4/1976 | Whitsett | 51/180 |
| 4,570,388 | 2/1986 | Tano et al. | 51/177 |
| 4,736,804 | 4/1988 | Geibel | 173/36 X |

FOREIGN PATENT DOCUMENTS

| | | | |
|---|---|---|---|
| 143047 | 7/1980 | Fed. Rep. of Germany . | |
| 3138516 | 8/1982 | Fed. Rep. of Germany | 408/716 |

*Primary Examiner*—Eugene F. Desmond

*Attorney, Agent, or Firm*—Joseph P. Gastel

[57] ABSTRACT

A tool mounting construction which includes a tool holder having a pneumatic cylinder, a piston in said cylinder for mounting a tool, pressure regulating means in communication with the cylinder for maintaining the pressure in the cylinder substantially constant regardless of the forces applied to the tool holder to thereby cause the piston to press the tool against a workpiece with a substantially constant force, an elongated rod having a first end for bearing against an external surface remote from the workpiece, and a connection between the tool holder and a second end of the rod for effecting a connection therebetween to thereby apply a force on the tool holder from the bearing relationship between the rod and the external surface. The foregoing tool mounting construction is mounted in a kit with a plurality of tubular extension rods for varying the length of the rod. The kit also contains a chest pad and associated coupling members which permit a workman to bear against the tool mounting construction with his body weight rather than applying the force thereto by sheer arm strength. A tool having pneumatic or mechanical mechanism integral therewith for causing the tool to apply a predetermined force on a work surface regardless of the external force applied to the tool. A tool mounting construction for moving a tool in a perfectly linear direction and which is mounted on an extension rod which is aligned with the linear direction by a level associated therewith.

24 Claims, 7 Drawing Sheets

TOOL MOUNTING CONSTRUCTION

BACKGROUND OF THE INVENTION

The present invention relates to an improved tool mounting construction for carrying a tool which is applied against various surfaces and to a tool which applies a predetermined force to a work surface regardless of the external force applied to the tool.

By way of background, especially in sanding and buffing operations, it is desirable to maintain the tool against the workpiece with a constant force. In the past this has been extremely difficult to achieve, especially where the workpiece had a curved surface. Furthermore, in the past a force generally had to be applied directly to a tool by the tool operator and this was not only difficult to achieve when the work area was in a hard-to-reach area, such as a ceiling, but it also required considerable effort on the part of the operator.

SUMMARY OF THE INVENTION

It is accordingly one important object of the present invention to provide an improved tool mounting construction which will cause a tool mounted thereon to be pressed against a workpiece with a substantially constant force regardless of the curvature of the workpiece.

Another object of the present invention is to provide an improved tool mounting construction wherein the tool need not be pressed directly against the workpiece by the workman but can be pressed against the workpiece by causing an extender rod construction to be pressed against an external surface about which the extender rod is swung by the workman.

A further object of the present invention is to provide an improved tool construction which causes a tool to be pressed against a workpiece with a substantially constant force regardless of variations in the force which is applied thereto.

A still further object of the present invention is to provide an improved construction for moving a tool in a perfectly linear direction relative to a work surface with a force which is provided in part by a properly aligned extender rod which bears against a surface which is remote from the work surface.

Yet another object of the present invention is to provide an improved rod joint which permits elongated rods to be assembled with each other in a relatively simple manner and which will hold the rods together against separation and which will permit them to be disassembled in a relatively simple manner. Other objects and attendant advantages of the present invention will readily be perceived hereafter.

The present invention relates to a tool mounting construction comprising a tool holder including motor means, means on said motor means for mounting a tool, means operatively associated with said motor means for maintaining the force exerted thereby substantially constant regardless of the force applied to said tool holder to thereby cause said motor means to press said tool against a workpiece with a substantially constant force, means having a first end for bearing against an external surface remote from said workpiece, and cooperating connecting means on said tool holder and on a second end of said rod means for effecting a connection therebetween to thereby apply a force on said tool holder from the bearing relationship between said rod means and said external surface whereby said substantially constant force is applied to said workpiece by said tool as said tool holder traverses said workpiece.

The present invention also relates to a friction lock between first and second ends of first and second lengths of rod, respectively, comprising a female end on said first length of rod, a male end on said second length of rod for tight-fitting engagement within said female end, and O-ring means effectively located between said male and female ends for permitting assembling and disassembling thereof with a combination of twisting and axial movement while providing a substantial resistance to disassembly by a substantially axial movement.

The present invention also relates to a tool mounting construction comprising a tool holder including motor means, means on said motor means for mounting a tool, and means operatively associated with said motor means for maintaining the force exerted thereby substantially constant regardless of the force applied to said tool holder to thereby cause said motor means to press said tool against a workpiece with a substantially constant force.

The present invention also relates to a tool attachment for causing a tool to press against a workpiece with a substantially constant force regardless of the force applied to the tool attachment comprising a cylinder, a piston in said cylinder, means on said piston for mounting a tool thereon, a pressure regulator means in communication with said cylinder for supplying said cylinder with pressurized fluid and for maintaining said fluid supplied to said cylinder at a substantially constant pressure, and coupling means coupled to said cylinder for receiving an external force for pressing said tool mounted on said piston against a workpiece.

The present invention also relates to a tool construction including a tool body, a tool on said tool body, first motor means in said tool body for operating said tool, and means in said tool body for urging said tool against a workpiece with a substantially constant force.

The present invention also relates to a tool mounting construction for moving a tool in a perfectly linear direction when said tool is in a predetermined attitude relative to a work surface comprising a tool holder including motor means, means on said motor means for mounting a tool, means operatively associated with said motor means for causing said motor means to press said tool against said work surface in said linear direction, rod means having a first end for bearing against an external surface remote from said work surface, cooperating connecting means on said tool holder and on a second end of said rod means for effecting a connection therebetween to thereby apply a force on said tool holder from the bearing relationship between said rod means and said external surface to thereby cause said motor means to press said tool against said work surface in said linear direction, and alignment means operatively associated with said rod means for aligning said rod means in an orientation which will cause said tool to have said predetermined attitude relative to said work surface.

The present invention will be more fully understood when the following portions of the specification are read in conjunction with the accompanying drawings wherein:

DESCRIPTION OF THE PREFERRED EMBODIMENTS

Figures 1, 2, 3, 4, 5, 6:
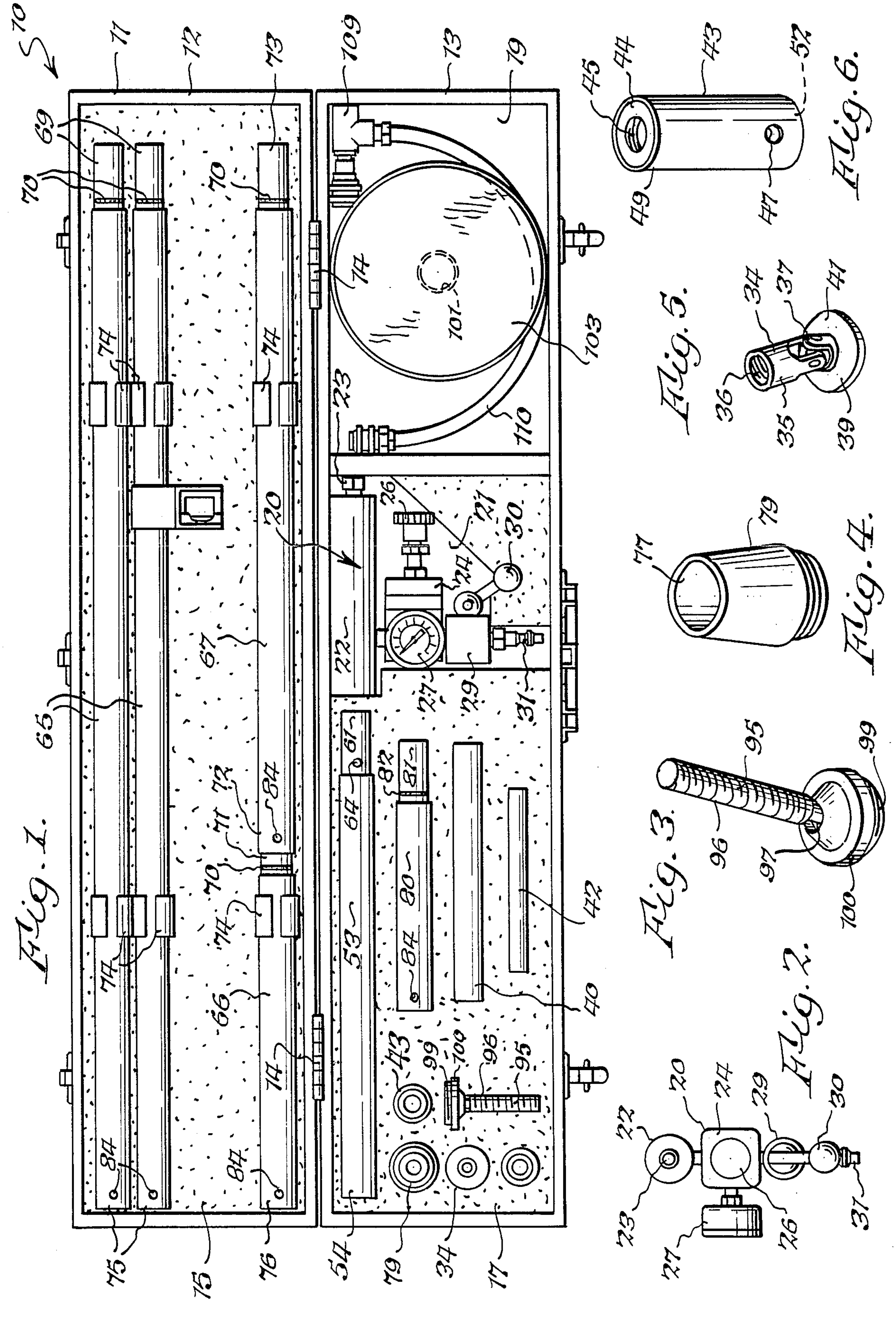
FIG. 1 is a plan view of a kit for carrying the various parts of the improved tool mounting construction of the present invention.
FIG. 2 is a side elevational view of the pneumatic cylinder and piston unit which includes the combination pressure regulator and relief valve and the main valve structure mounted thereon.
FIG. 3 is a perspective view of an universal connector for mounting the pressure pad of FIGS. 12 and 15 onto the piston and cylinder unit of FIG. 2.
FIG. 4 is a perspective view of a rubber traction tip which is mounted on the end of the extension rod remote from the piston and cylinder unit.
FIG. 5 is a perspective view of an universal connector for interfacing with a tool and extension rods.
FIG. 6 is a relatively short adapter which is used in conjunction with extension rods.
Figure 7:
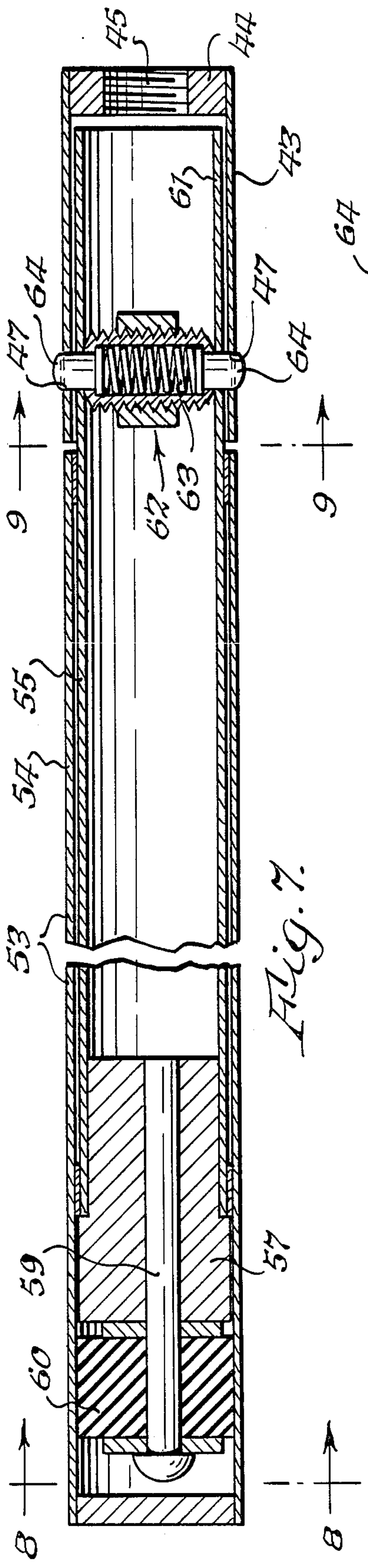
FIG. 7 is a fragmentary cross sectional view of an adjustable extension rod mounted on the adapter of FIG. 6.
Figure 9:
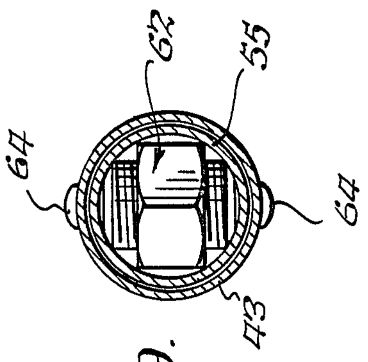
FIG. 9 is a cross sectional view taken substantially along line 9—9 of FIG. 8 and showing detent structure for mounting the adjustable extension rod on the adapter of FIG. 6.

The improved tool mounting construction 10 of the present invention is conveniently carried in fitted case 11 having a top 12 connected to a bottom 13 by a plurality of hinges 14. The top 12 is lined with foam material 15 having suitable depressions therein (not numbered) for receiving the various parts. The bottom 13 is also lined with foam material 17 having depressions therein for receiving the various parts. The bottom 13 also has a compartment 19 for receiving certain parts. The various fittings for locking the top 12 to the bottom 13 when case 11 is closed are not numbered.

A piston and cylinder unit 20 (FIGS. 1, 2 and 16) is normally housed within compartment 21 when not in use and it includes a cylinder 22 mounting a piston 23, which essentially comprises a fluid motor. The piston and cylinder ar single acting, and an adjustable combination regulator and relief valve 24 is in communication with chamber 25 of cylinder 22. A knob 26 adjusts the pressure which is obtained in chamber 25 and a gauge 27 is provided for reading the operating pressure. Valve 24 may be of the R-10 type manufactured by the Bellofram Corporation. A three-way manually operated valve 29 is in communication with pressure regulator valve 24 and it includes a handle 30 which causes the pressure regulator valve 24 to communicate with a conduit 31 leading from a pneumatic pressure source or for causing the pressure regulator valve 24 and chamber 25 to be vented to the atmosphere through conduit 32.

In normal use, a tool, such as a disc sander 33 (FIGS. 14, 18 and 19), is effectively coupled to the piston 23 of cylinder and piston unit 20. This coupling is effected by the use of a universal connector 34 (FIG. 5) which is integrally connected to sander 33 or which can be permanently or temporarily adhered thereto. The universal 34 includes a socket 35 which is internally threaded at 36 (FIG. 5) for threading onto the end 23' (FIG. 16) of piston 23. A conventional universal joint 37 is located at the end of socket 35 and on the opposite end of universal joint 37 a disc 39 is located which is either permanently attached to sander 33 or which can be adhesively affixed thereto. In the latter respect, the kit 11 contains a stick 40 of epoxy putty which can be kneaded into a ball and pressed against the side of the tool by member 39 of universal 36 so that the putty overlies the edge 41 of disc 39. In this manner the epoxy putty will adhere to the side of the tool and will also carry disc 41 which is to be connected to piston 23. The epoxy putty, after hardening, can be removed from the tool by striking it so that it separates therefrom but it will remain a part of disc 39. When the hardened epoxy putty is to be reattached to a flat surface of a tool, epoxy cement 42 can be used.

Figure 19:
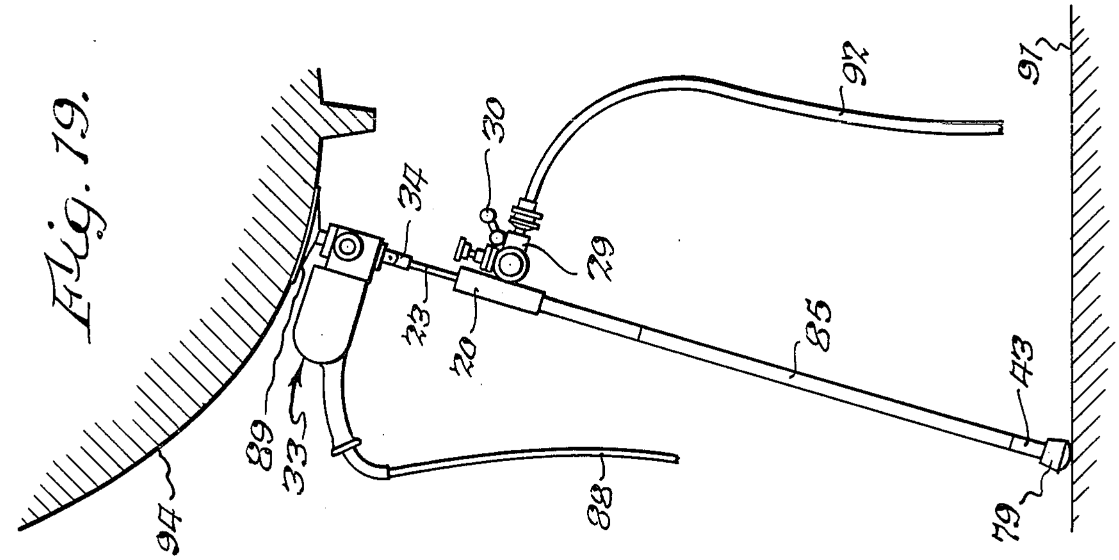
FIG. 19 is a fragmentary side elevational view showing how an extension rod assembly mounts the piston and cylinder structure and a sander for bearing with a substantially constant force on the undersurface of a boat or another body having a curved undersurface.
Figure 18:
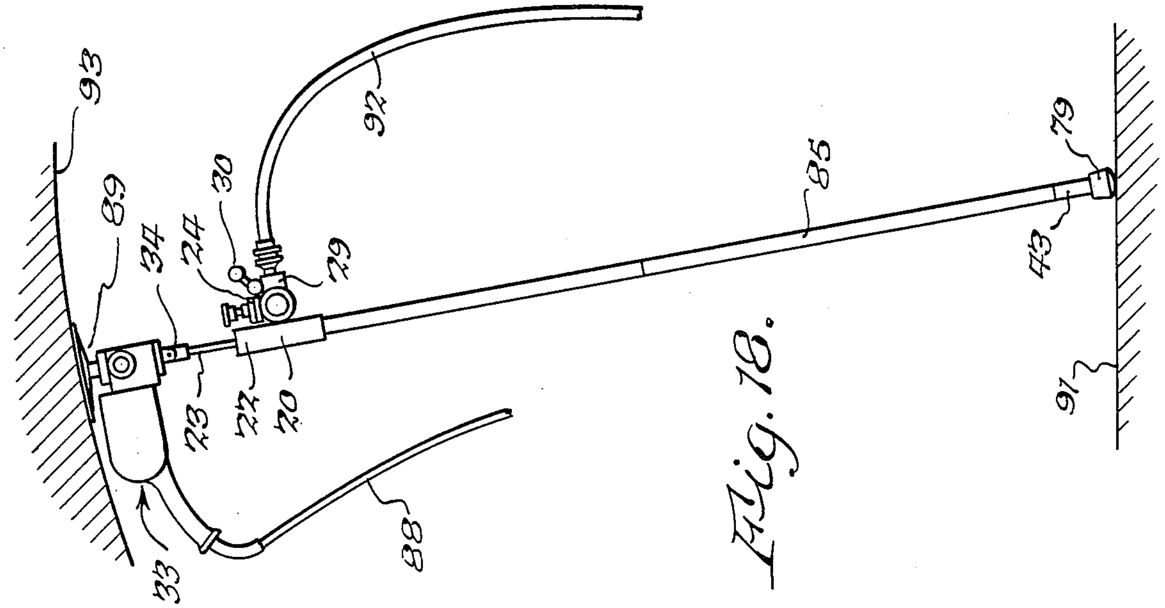
FIG. 18 is a fragmentary side elevational view showing how a sander can be applied to a curved surface with substantially constant force while the extension rods bear against a lower surface.

A short adapter 43 (FIG. 6) is essentially a hollow tubular member which includes an end wall 44 which is tapped at 45. A pair of diametrically opposed holes 47 (FIGS. 6 and 7) are provided in the opposite end of short tubular member which may have a length of about 3 inches. Adapter 43 can be used in a number of different ways, as shown in FIGS. 14, 15 and 18–20. One way in which adapter 43 is used is by inserting its end 49 into opening 77 of rubber traction tip 79. Thereafter, the small ends of any one of a number of tubular extension rods may be inserted into the open end 52 of adapter member 43. One type of extension rod, which is adjustable, is shown at 53 (FIGS. 1, 7, 8 and 9). Adjustable extension rod 53 includes an outer tube 54 which telescopically receives an inner tube 55. A cylindrical block 57 is fixedly mounted in the end of inner tube 55, and it mounts a off-center pin 59 therein which off-centeredly mounts a rubber cylinder 60 at its outer end. When inner tube 55 is twisted relative to outer tube 54, disc 60 will produce a wedging relationship therebetween to hold adjustable tube 53 in any given extended position. The end portion 61 of inner tube 55 mounts a spring-biased detent member 62 which includes a spring 63 biasing detent members 64 outwardly which are received in holes 47 of adapter 43. The left end of outer tube 54 (FIG. 7) fits into chamber 50 (FIG. 16) of the cylinder 22 and is held therein by a friction fit with O-ring 51 which is located in a groove in the wall of chamber 50. After traction tip 79 is caused to bear against an external surface, such as floor 91 (FIG. 14), the extension rod is then swung back and forth in the manner shown in FIG. 14 and the tool, such as sander 89, will bear against ceiling 90 with a constant force, regardless of the force applied to piston 23 by the extension rod and regardless of the reactive force applied to cylinder 22 by the sander bearing on the ceiling. If the extension rod is used with a curved surface, such as shown in FIGS. 18 and 19, it can be varied in length during a sanding operation so as to increase the area on which the tool is capable of working, and the sander will be caused to engage the work area with a constant force regardless of the force applied to the piston-cylinder unit 20 either by the extension rod or by the reactive force of the workpiece.

Another way of installing various lengths of extenders into chamber 50 of cylinder-piston unit 20 is by the use of extender rods or tubes, such as 65, 66 or 67. Extender rods 65 each include a male reduced end portion 69 having an O-ring 70 mounted in a groove therein. Extension tube or rod 66 includes a male reduced end portion 71 which, when in the kit, is inserted into end 72 of rod or tube 67 which also has a male reduced end portion 73. The extenders 65, 66 and 67 are retained in kit top 12 by means of plastic clips 74. In use, the large ends, such as 75, 76 or 72 of any one of extenders 65, 66 and 67, respectively, is inserted into chamber 50 of cylinder 22, and the reduced end portion, such as 69, 71 or 73, respectively, of any one of these extenders is inserted into the large end portion of another extender or into the hollow end 52 of adapter 43 (FIG. 6), the end 49 of which is inserted into rubber traction tip 79. By way of example, extender rods 65 are each approximately 3 feet long, extender rod 66 is approximately 1 foot long, and extender rod 67 is approximately 2 feet long. A short extender rod 80 is also provided which is approximately 6 inches long and has a reduced end portion 81 with an O-ring 82 mounted therein in the same manner as the reduced end portions of the other extender rods or tubes.

If for example it is desired to have approximately 6 feet of extension tubes, the large end of one of the tubes 65 is inserted into chamber 50 of cylinder 22, and the small end 69 of this tube is inserted into the large end of the other tube 65, and the small end of the latter tube is inserted into the open end 52 of adapter 43 (FIG. 6), the large end of which, in turn, is installed in traction tip 79. If it is desired that the approximate length of the assembled extender tubes should be approximately 8 feet, extender tube 67, which is two feet long, has its small end 73 inserted into the large end of two coupled extender tubes 65 and its large end 73 is inserted into adapter 43 which is inserted into traction tip 79. Another foot can be added by the use of extender tube 66. Thus, various lengths of extension can be obtained by selecting the proper combination of extender tubes 65, 66, 67 and 80. Furthermore, adjustable extender 53 may be used in combination with any of the aforementioned fixed length extenders in which instance the large end of adjustable extender 53 is inserted into cylinder chamber 50 and the large ends of any of the extenders 65, 66, 67 or 80 are telescopically mounted on the reduced end 61 of adjustable extender 53 and retained thereon by detents 64 which are received in diametrically opposed holes of the fixed length extenders, such holes in all of the fixed length extenders being designated by numeral 84, and the small end of the last extender is inserted into adapter 43 mounted in traction tip 43. The advantage of the use of the adjustable extender 53 in the foregoing manner is that the length of the entire extension rod assembly can be varied by adjusting the length of extender 53.

After a suitable combination of extender tubes or rods 65, 66, 67, 53 and 80 have been assembled in the foregoing manner and attached to cylinder-piston unit 20 which mounts a tool such as 33, the assembly is ready for operation. For ease of explanation, an extension rod or an assembly of extension rods will be designated by numeral 85 in FIGS. 14 and 18–20 wherein the ultimate objective of one aspect of the present invention is graphically displayed, namely, the application of a uniform working force against a curved or planar surface without actually requiring the operator to exert a direct force against that surface, such force being applied by swinging the extension rod or extension rod assembly 85 from side-to-side, as graphically depicted by arrow 87 in FIG. 14.

Figure 14:
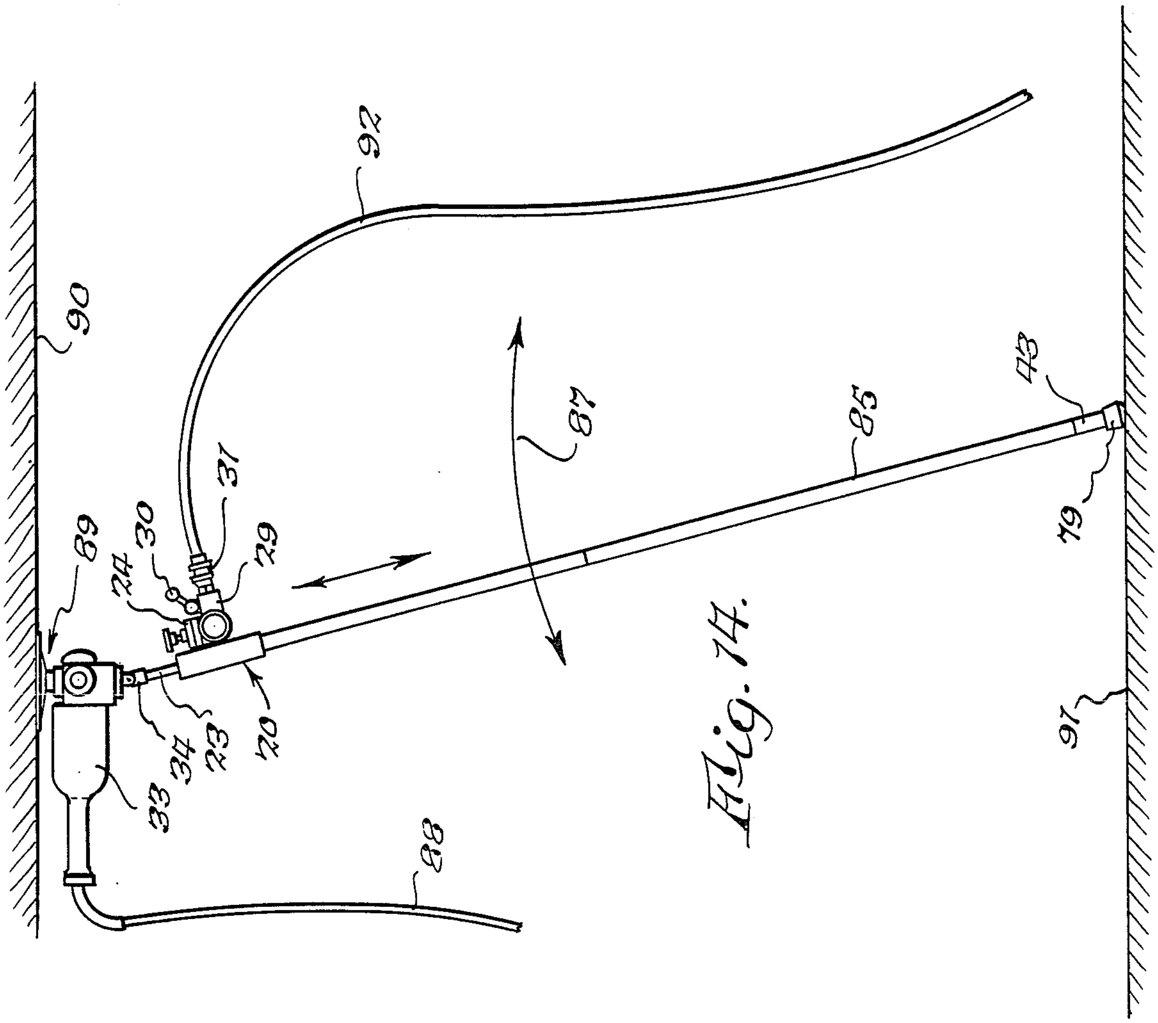
FIG. 14 is a fragmentary side elevational view of the piston and cylinder structure mounted on an extension rod assembly which bears on a floor surface and presses a sander against a ceiling with substantially constant force as the extension rod is swung laterally.

The disc sander 33 of FIG. 14 is connected by electrical lead 88 to a source of electricity. As noted above, it is mechanically mounted on piston 23 by universal 34, and thus the disc 89 of sander 33 can move in all directions to accommodate itself to ceiling surface 90. The rubber traction tip 79 bears against floor 91. As rod assembly 85 is swung back and forth in the direction of arrow 87, sanding disc 89 will maintain flat contact with ceiling 90 because of the action of universal 34. Additionally, piston 23 will move into and out of cylinder 22 as required to maintain a constant force of disc 89 on ceiling 90. This action is due to the operation of the adjustable combination regulator and relief valve 24 which is supplied with compressed air by conduit 92. Rubber traction tip 79 prevents the lower end of extension rod combination 85 from slipping relative to floor 91.

In FIG. 18 the assembly is shown working on a concave surface 93, which may be a curved ceiling or any other surface. The curvature of surface 93 does not lie on a radius with the rubber traction tip 79 as a center. As discussed above relative to FIG. 14, the sander disc 89 will be maintained in good face-to-face contact with surface 93 because of the action of universal 34 and the force will always remain constant because of the action of regulator-relief valve 24.

In FIG. 19 the assembly of FIGS. 14 and 18 is shown operating on a convex surface, such as the hull 94 of a boat. The action will be the same as discussed above relative to FIGS. 14 and 18 wherein the face of sander disc 89 will be maintained in good flush contact with surface 94 as extender rod combination 85 is swung back and forth because of the action of universal 34, and the force will remain constant because of the action of combination pressure regulator and relief valve 24.

Figure 12:
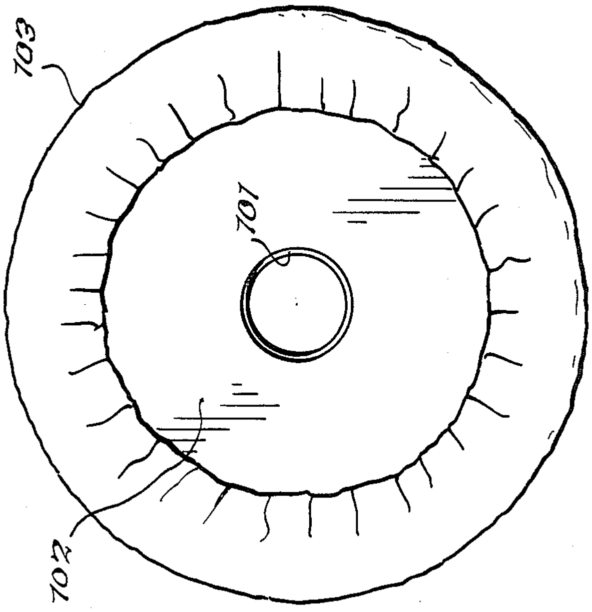
FIG. 12 is a plan view of the rear face of a pad which can be mounted on the piston and cylinder unit of FIG. 2.
Figure 16:
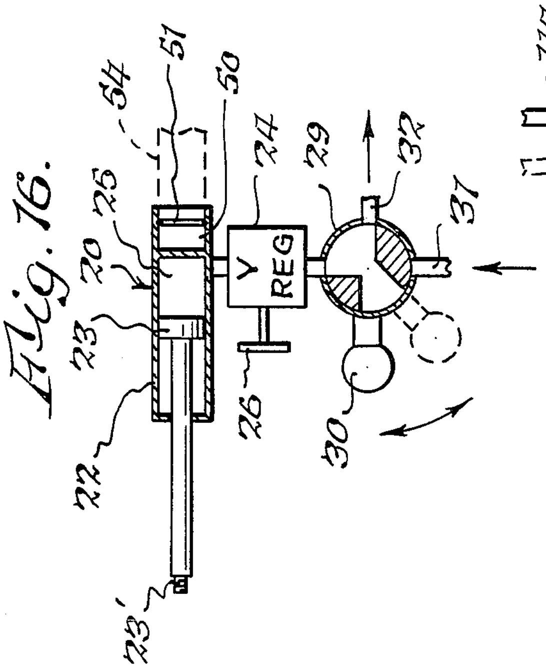
FIG. 16 is a fragmentary cross sectional view of the piston and cylinder unit of FIG. 2.
Figure 15:
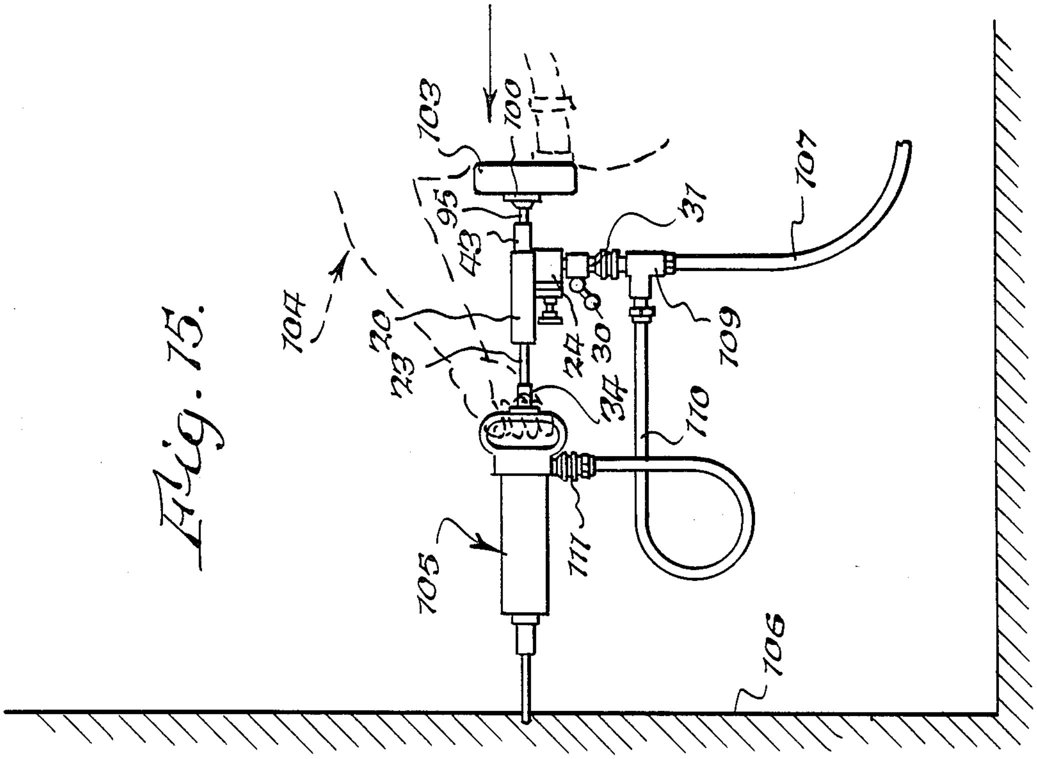
FIG. 15 is a fragmentary side elevational view of the piston and cylinder unit mounting the pad of FIG. 12 for bearing against the body of a workman and also mounting a tool for working on a side wall.

In FIG. 15 another structure is shown in accordance with the present invention. The cylinder-piston unit 20 has the open end 52 of adapter 43 (FIG. 6) inserted into chamber 50 of cylinder 20. The threaded stem 95 of swivel pad 96 (FIG. 3) is threaded into tapped bore 45 of adapter 43. A ball joint is located at 97. The threaded end 99 of swivel pad base 100 is threaded into tapped opening 101 of plate 102 of pad 103 (FIG. 12). A workman 104 presses his body against pad 103 while holding a tool, such as a drill 105, which is drilling into wall 106. Thus his body mass, rather than his arms, forces the drill. The piston rod must be in a modulating mid-stroke position, as shown in FIG. 16, to effect a constant force on work being done on surface 106. Air is supplied to cylinder-piston unit 20 by conduit 107 which is connected to one end of tee 109 (FIGS. 1 and 15) which also has an outlet in communication with conduit 110 which is connected to air inlet 111 of drill 105. Thus, drill 105 is pressed with constant force into wall 106 and its attitude can be varied because of the action of universal 34 while the body of the workman bears against pad 103. However, it is preferable that a rigid fitting 34', as described hereafter relative to FIG. 20, be used rather than universal fitting 34 to maintain the drill bit perfectly straight. In addition, tee 109 permits a single conduit 107 to supply the desired air pressure to both cylinder-piston unit 20 and to air drill 105. A manually actuated trigger (not shown) actuates the motor in drill 105 after it is properly positioned. While an air drill has been depicted in FIG. 15, it will be appreciated that an electric drill or any other tool, such as a sander or a buffer or any other device, can be used in the same manner.

Figure 13:
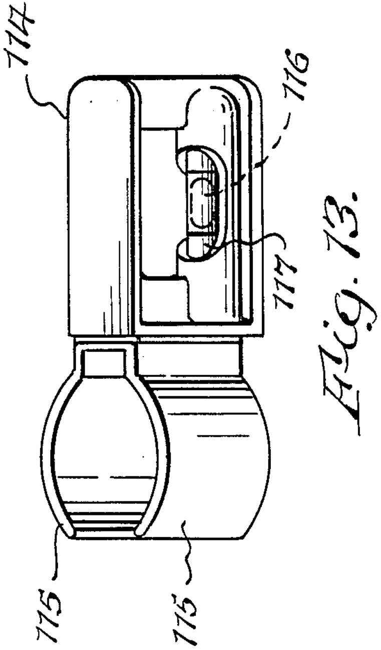
FIG. 13 is a perspective view of a level for use with the extension rods as shown in FIG. 17.
Figure 17:
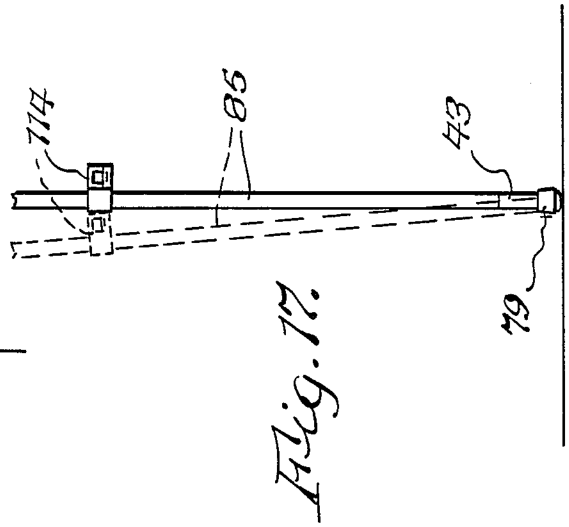
FIG. 17 is a diagrammatic view showing how an extension rod is oriented in a strictly vertical direction by use of the level of FIG. 13.
Figure 20:
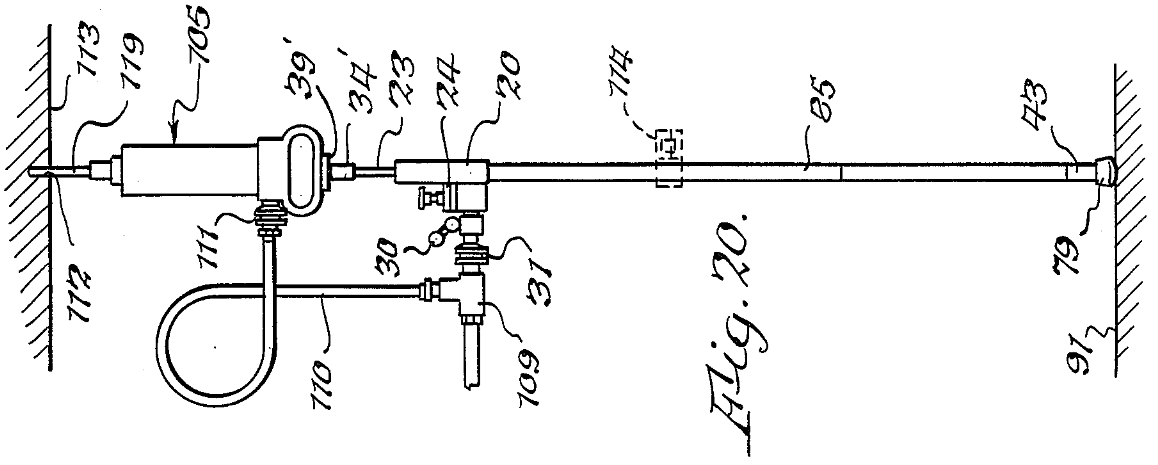
FIG. 20 is a side elevational view of a extension rod which has been oriented in a perfectly vertical direction by the use of the bubble level of FIGS. 13 and 17 for mounting the piston and cylinder construction and a drill for drilling a perfectly vertical hole in a ceiling.

In FIGS. 17 and 20 another way of using the present tool holder construction is disclosed. When it is desired to drill a perfectly vertical hole 112 in ceiling 113 (FIG. 20), the extender rod assembly is made perfectly vertical by the use of a bubble level 114 (FIG. 13) which has resilient plastic arms 115 which clip onto extender rod combination 85. Level 14 has an air bubble 116 located in a tube of liquid 117, the axis of which is perpendicular to the longitudinal axis of a rod assembly 85 on which resilient clip portions 115 are mounted. Thus, in order to make rod assembly 85 perfectly vertical, to drill a vertical hole 112 (FIG. 20), the tip of the drill bit 119 is placed on the spot where the hole is to be drilled. In this embodiment, a fitting 34' receives the end of piston 23. Fitting 34' is not an universal but a fitting in which the tubular portion (not numbered) which receives piston rod 23 is rigidly affixed to plate 39' with its longitudinal axis perpendicular to the plate. Thus fitting 34' is a rigid extension of piston 23 and the drill body is a rigid extension of fitting 34'. As noted above, the tip of the drill bit is placed on the spot where the hole is to be drilled while the traction tip of the extension rod assembly is held about one-half inch above the floor. In this position the piston is fully retracted within the cylinder. Thereafter, the fluid pressure is admitted to cylinder 22 while the extension rod assembly is held approximately vertical, and the traction tip will be caused to bear against the floor. The drill bit 119 is then made perfectly vertical by moving the tube assembly 85 back and forth until the bubble in level 114 is perfectly centered in two 90° removed positions, that is, for example, when the bubble tube lies in the plane of the drawing and when it extends perpendicularly thereto. This will cause rubber traction tip 79 to lie on a vertical line directly below the point at which the hole 112 is to be drilled, and the longitudinal axis of the tube assembly 85 will be in alignment with the drill bit 119. A trigger (not shown) on drill 105 is then actuated to cause pressurized fluid to be admitted to the drill to drive a pneumatic motor to rotate the drill bit 119, which will be forced into the ceiling by the pressure exerted by cylinder-piston unit 20. In this respect, the travel of piston 23 is usually sufficient to drill the depth of hole which is required. However, if it is not, adjustable extender rod 53 can be used to provide the desired travel of drill bit 119. Of course if the drill 105 is an electrically operated drill, the trigger associated therewith will actuate an electric motor to drive drill bit 119. However, the pneumatics described above will function in the same manner.

Figure 11:
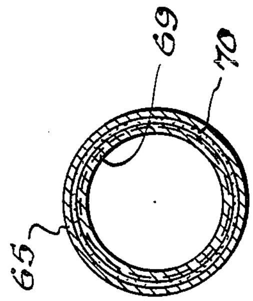
FIG. 11 is a cross sectional view taken substantially along line 11—11 of FIG. 10.
Figure 8:
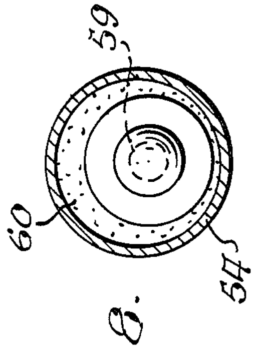
FIG. 8 is a cross sectional view taken substantially along line 8—8 of FIG. 7 and showing the locking mechanism for securing the adjustable extension rod in a desired adjusted length.
Figure 10:
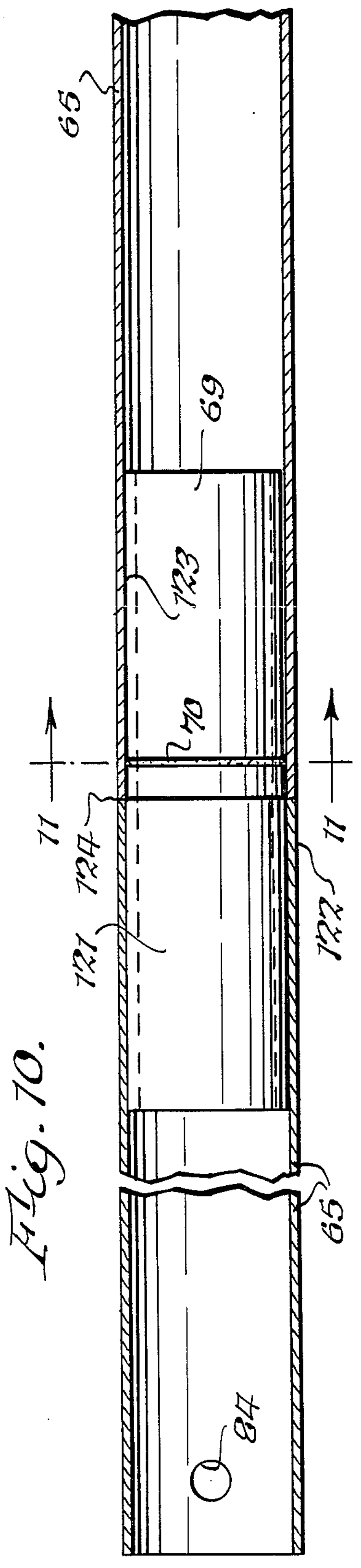
FIG. 10 is a fragmentary cross sectional view of a plurality of longer extension rods mounted in assembled relationship with an O-ring friction lock structure therebetween.

In accordance with another aspect of the present invention, an unique locking arrangement is provided for locking the various tubes 65, 66, 67 and 80 to each other. In this respect, as noted above, each of the rods has a large female end and a reduced male end portion which carries an O-ring 70 in a suitable groove. The reduced end portion, for example 69 (FIGS. 1, 10 and 11), is formed by a tube which has an end portion 121 pressfitted into the end of tubular rod 65, and it has a slightly smaller diameter portion 69 protruding from the end 122 of tubular rod 65. The internal diameter 123 of rod portion 65 at the right of FIG. 10 is slightly greater than the diameter of smaller diameter portion 69 so that it can slip thereon. However, to go beyond O-ring 70 to the position shown in FIG. 10, the rod 65 at the right of FIG. 10 must be twisted and simultaneously moved axially relative to the rod 65 at the left of FIG. 10, and thus it can move to the position shown in FIG. 10 wherein the ends of the two rods 65 are in abutting relationship at 124. The tubular rods 65 cannot be separated easily by pulling them apart with a strictly longitudinal pull as this will cause the O-ring 70 to tend to extrude between outer wall 69 and the inner wall of rod 65 to prevent their being pulled apart. However, the two rods 65 can be separated with a simultaneous twisting and axial pulling motion until the very end of the right-hand rod 65 passes over the O-ring 70. The same type of connection exists to a lesser degree between the large end of any one of the extenders and the O-ring in chamber 50 of cylinder 22.

Figure 21:
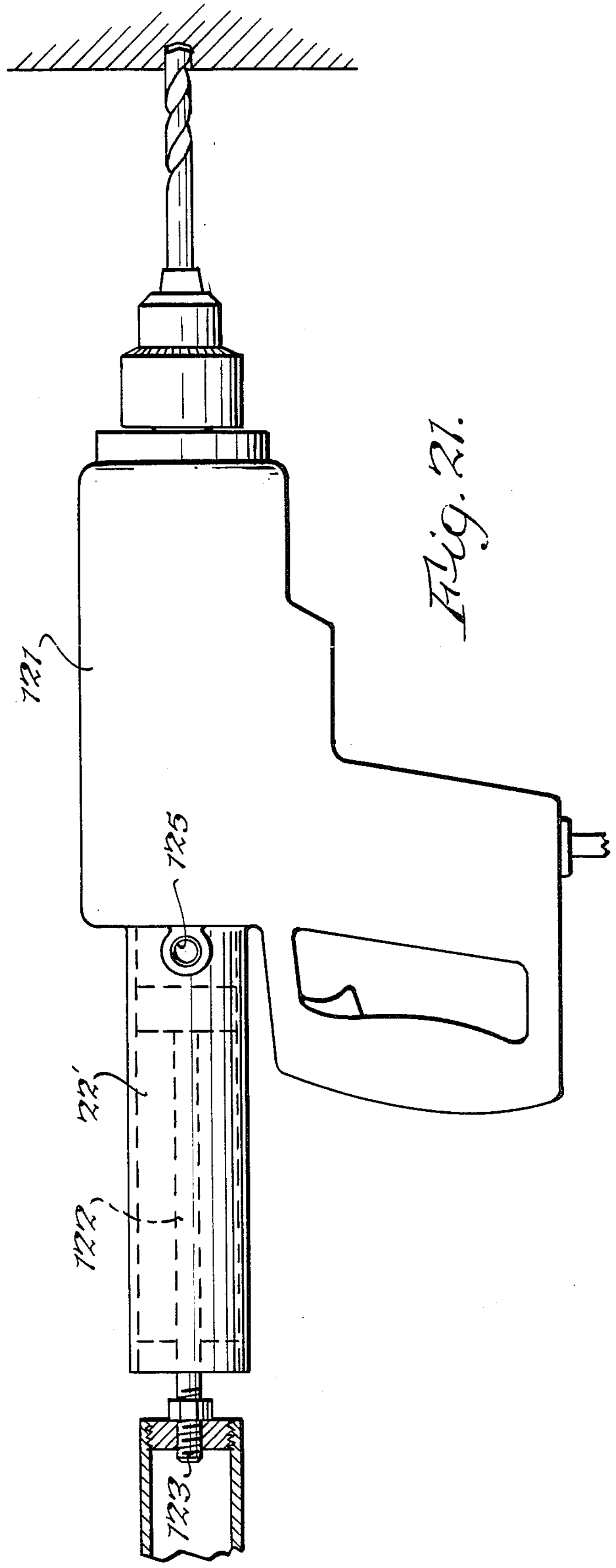
FIG. 21 is a fragmentary side elevational view, partially in cross section showing a tool having a pneumatic cylinder formed as an integral part thereof.
Figure 23:
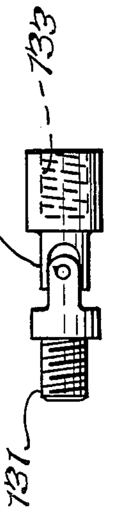
FIG. 23 is a plan view of an universal connector for use with the adapter of FIG. 22.

In FIG. 21 another embodiment of the present invention is shown wherein a cylinder 22', which is analogous to cylinder 22 of FIG. 16, is formed as an integral part of tool 121 and it has a piston 122 therein. The outer end 123 is connectable to an extender tube or rod (not numbered) which has a suitable end to receive it. It is to be noted that there is a rigid connection between piston 123 and the extender tube so that the drill can be used to drill holes in ceilings in the manner described above relative to FIG. 20. A threaded opening 125 is located in cylinder 22' to receive a fitting from a pressure regulator valve such as 24 of FIG. 2, and the electric drill 121 is energized by actuating the trigger (not numbered). As noted above relative to FIG. 20, drill 121 may be a pneumatically-actuated drill, and such a drill may have the integral piston-cylinder system such as shown for the electric drill.

Figure 22:
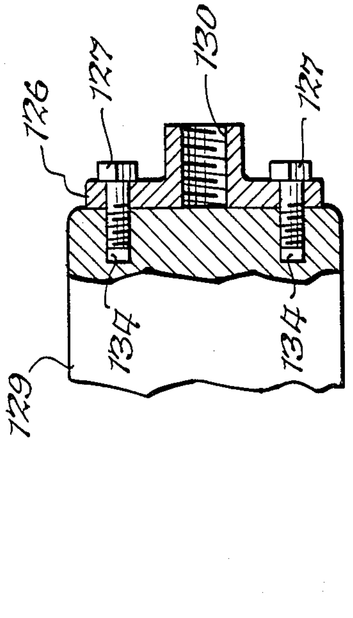
FIG. 22 is a fragmentary view partly in cross section, showing an adapter mounted on a tool for receiving a connecting member such as shown in FIG. 23.

In FIG. 22 an adapter 126 is shown attached by screws 127 to a tool 129 and having a tapped bore 130 for receiving the threaded end 131 of an universal adapter 132 having a tapped bore 133 which can receive the threaded end 23' (FIG. 16) of piston 23. The adapter 126 can be attached to any tool having tapped holes 134 in its housing for receiving screws 127. Universal adapter 132 may be connected between adapter 126 and piston 23 to provide the same type of swivel action as universal connector 34 of FIG. 5. Alternately, the threaded end of piston 23 can be connected directly to tapped opening 130 to provide a rigid connection, as for the ceiling drilling described above.

Figure 24:
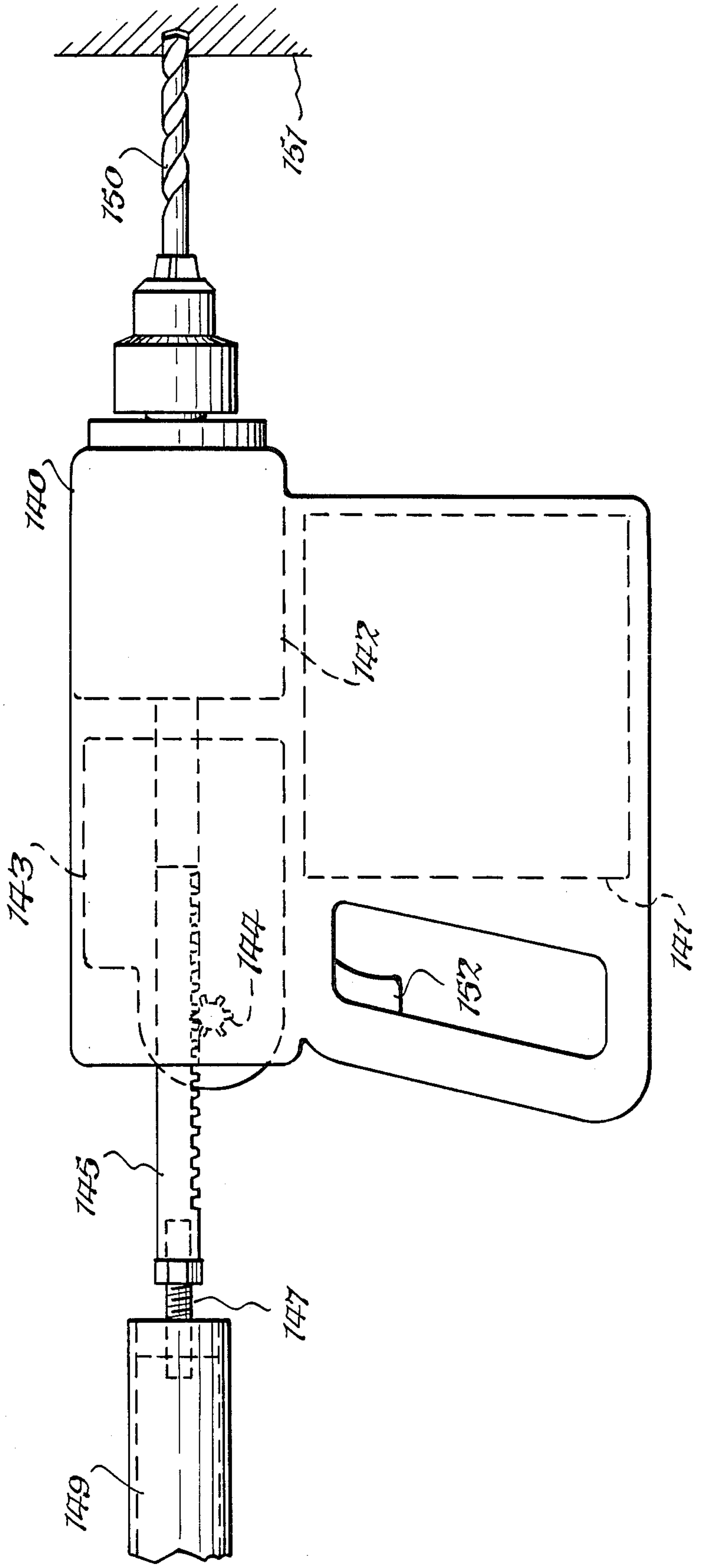
FIG. 24 is a fragmentary side elevational view of a tool with an electro-mechanical construction for applying a constant force against a workpiece.

In FIG. 24 a still further embodiment of the present invention is disclosed. The tool 140 may be a regular drill or a hammer drill or any other type of tool. It has a self-contained power supply 141, such as a battery, and a power unit 142, such as a motor coupled thereto for driving drill bit 150. A transmission 143 is suitably coupled to power unit 142 and it includes a pinion 144 in mesh with a rack 145 which is suitably attached at 147 to an extender rod 149, which may be of any type and which is used as explained above relative to FIGS. 1–20. A clutch (not shown) is included in the transmission 143 to maintain the torque at pinion 144 at a predetermined amount to thereby maintain the force of drill bit 150 against wall 151 substantially constant while the pinion 144 drives the tool 140 toward the wall. A suitable track (not shown) is provided for rack 145 within the tool 140 to guide it rectilinearly. The trigger 152 may be actuated when it is within reach of the operator, or a remote switch (not shown) may be used to actuate the tool 140. Tool 140 may be used without extender rod 149, in which event it is held by the pistol grip at trigger 152, and the drill bit 150 will be forced into wall 151 with a constant force regardless of the external force exerted on the drill 140 by the workman. When the tool is a drill, as shown, and the work surface 151 is a ceiling, extender rod 149 can be oriented in a perfectly vertical attitude in the manner described above relative to FIGS. 17 and 20 to thus drill the hole squarely into the ceiling. In this respect, for drilling a hole into a ceiling, there is a rigid connection at 147 between rack 145 and extender rod 149. Furthermore, in order to press the tip of drill bit 150 against the ceiling in a manner which is analogous to the pressing performed by the pneumatic cylinders described above relative to FIGS. 20 and 21 prior to aligning the extender rod 149 vertically in the above-described manner, the transmission may have a two-stage action with the first stage responsive to a partial actuation of the trigger 152 to move the rack to advance the drill body until it is resisted by a predetermined force without actuating the drill bit itself, and thereafter further actuation of trigger 152' will result in operating the drill and forcing rack 145 rearwardly to force the drill bit into surface 151. In certain circumstances it may be desired to drill a hole into a vertical surface when an extender rod is needed, and the latter may be oriented in a perfectly horizontal attitude by use of suitable leveling devices.

While the description of FIGS. 1–21 has referred to a pneumatic motor, it will be appreciated that an hydraulic motor may be desired in certain applications and therefore the following claims which refer to a fluid motor are intended to cover both embodiments.

It can thus be seen that the improved tool mounting construction of the present invention is manifestly capable of achieving the above-enumerated objects, and while preferred embodiments of the present invention have been disclosed, it will be appreciated that it is not limited thereto but may be otherwise embodied within the scope of the following claims.

What is claimed is:

1. A tool mounting construction comprising a tool holder including a fluid cylinder and piston therein, means on said piston for mounting a tool, pressure regulating means in communication with said cylinder for maintaining the pressure in said cylinder substantially constant regardless of the force applied to said tool holder to thereby cause said piston to press said tool against a workpiece with a substantially constant force, rod means having a first end for bearing against an external surface remote from said workpiece, and cooperating connecting means on said tool holder and on a second end of said rod means for effecting a connection therebetween to thereby apply a force on said tool holder from the bearing relationship between said rod means and said external surface whereby said substantially constant force is applied to said workpiece by said tool as said tool holder traverses said workpiece.

2. A tool mounting construction as set forth in claim 1 wherein said rod means comprise a plurality of extension rods, and attachment means for connecting said extension rods in end-to-end relationship to vary the length of said rod means.

3. A tool mounting construction as set forth in claim 1 including traction tip means for selective attachment to said first end of said rod means to thereby prevent said rod means from slipping on said external surface.

4. A tool mounting construction as set forth in claim 3 wherein said rod means comprise a plurality of extension rods, and attachment means for connecting said extension rods in end-to-end relationship to vary the length of said rod means.

5. A tool mounting construction as set forth in claim 4 wherein said extension rods comprise first and second rods having first and second ends, respectively, and wherein said attachment means comprise a friction lock between said first and second ends of said first and second rods, respectively, said friction lock comprising a female end on said first rod, a male end on said second rod for tight-fitting engagement within said female end, and O-ring means effectively located between said male and female ends for permitting assembling and disassembling thereof with a combination of twisting and axial movement while providing a substantial resistance to disassembly by a substantially axial movement.

6. A friction lock as set forth in claim 5 wherein said O-ring means is mounted in a groove in said male end.

7. A tool mounting construction as set forth in claim 1 including a T-connector including a first conduit for attachment to said pressure regulator, a second conduit for attachment to a source of fluid pressure, and a third conduit for connection to a fluid actuated tool whereby the fluid pressure from said source of fluid pressure communicates with both said pressure regulator and said fluid actuated tool.

8. A tool mounting construction as set forth in claim 1 wherein said rod means comprises an adjustable extension rod whereby the length of said rod means may be adjusted.

9. A tool mounting construction as set forth in claim 1 wherein said means on said piston for mounting a tool comprises first attachment means on said piston, a connector member for attachment to a tool for mounting on said first attachment means on said piston, said connector member comprising an universal including second attachment means at one end of said universal for mounting on said first attachment means, and third attachment means on the other end of said universal for attachment to said tool.

10. A tool mounting construction as set forth in claim 9 including epoxy putty means for effecting a solid formed interface member between said tool and said third attachment means by forming to the surface of said tool and adhering thereto and forming to the surface of said third attachment means and adhering thereto.

11. A tool mounting construction as set forth in claim 10 including epoxy cement means for reattaching said solid formed interface member to said tool after it has been separated therefrom.

12. A tool mounting construction as set forth in claim 1 including swivel means for connection to said rod means, and pad means for connection to said swivel means and for being pressed upon by the body of a workman which constitutes said external surface.

13. A tool mounting construction as set forth in claim 1 including bubble level means, and means for mounting said bubble level means on said rod means for adjusting the attitude of said rod means.

14. A tool mounting construction as set forth in claim 1 including valve means coupled to said pressure regulating means for selectively coupling said pressure regulating means to a source of fluid pressure or for terminating fluid flow to said pressure regulating means and venting said pressure regulating means.

15. A tool attachment for causing a tool to press against a workpiece with a substantially constant force regardless of the force applied to the tool attachment comprising a cylinder, a piston in said cylinder, means on said piston for mounting a tool thereon, a pressure regulator means in communication with said cylinder for supplying said cylinder with pressurized fluid and for maintaining said fluid supplied to said cylinder at a substantially constant pressure, and means coupled to said cylinder for receiving an external force for pressing said tool mounted on said piston against a workpiece.

16. A tool attachment as set forth in claim 15 wherein said means coupled to said cylinder comprises a chamber in line with said cylinder for receiving an external member to which said external force is applied.

17. A tool attachment as set forth in claim 15 including valve means in communication with said pressure regulator means for supplying compressed air thereto or permitting said pressure regulator means to be vented.

18. A tool construction including a tool body, a tool on said tool body, first motor means in said tool body for operating said tool, means in said tool body for urging said tool against a workpiece with a substantially constant force, and means for applying a constant reactive force against said last-mentioned means.

19. A tool construction as set forth in claim 18 wherein said means in said tool body comprises a fluid motor.

20. A tool construction as set forth in claim 18 wherein said last-mentioned means comprises an electric motor, and transmission means operatively associated therewith.

21. A tool mounting construction comprising a tool holder including motor means, means on said motor means for mounting a tool, means operatively associated with said motor means for maintaining the force exerted thereby substantially constant regardless of the force applied to said tool holder to thereby cause said motor means to press said tool against a workpiece with a substantially constant force, rod means having a first end for bearing against an external surface remote from said workpiece, and cooperating connecting means on said tool holder and on a second end of said rod means for effecting a connection therebetween to thereby apply a force on said tool holder from the bearing relationship between said rod means and said external surface whereby said substantially constant force is applied to said workpiece by said tool as said tool holder traverses said workpiece.

22. A tool mounting construction comprising a tool holder including motor means, means on said motor means for mounting a tool, and means operatively associated with said motor means for maintaining the force exerted thereby substantially constant regardless of the force applied to said tool holder to thereby cause said motor means to press said tool against a workpiece with a substantially constant force.

23. A tool mounting construction for moving a tool in a perfectly linear direction when said tool is in a predetermined attitude relative to a work surface comprising a tool holder including motor means, means on said motor means for mounting a tool, force regulating means operatively associated with said motor means for causing said motor means to press said tool against said work surface with a substantially constant force in said linear direction, rod means having a first end for bearing against an external surface remote from said work surface, cooperating connecting means on said tool holder and on a second end of said rod means for effecting a connection therebetween to thereby apply a force on said tool holder from the bearing relationship between said rod means and said external surface to thereby cause said motor means to press said tool against said work surface in said linear direction with said substantially constant force, and alignment means operatively associated with said rod means for aligning said rod means in an orientation which will cause said tool to have said predetermined attitude relative to said work surface.

24. A tool mounting construction as set forth in claim 23 wherein said alignment means comprises bubble level means, and means for mounting said bubble level means on said rod means for aligning said rod means in said orientation.

* * * * *

UNITED STATES PATENT AND TRADEMARK OFFICE
CERTIFICATE OF CORRECTION

PATENT NO. : 4,870,730

DATED : October 3, 1989

INVENTOR(S) : John C. Belknap

It is certified that error appears in the above-identified patent and that said Letters Patent is hereby corrected as shown below:

Column 1, line 62, before "means" insert --rod--.

Column 4, line 27, change "ar" to --are--.

Column 12, line 7 (claim 20), delete "last-mentioned", and after "means" insert --in said tool body--.

Signed and Sealed this

Second Day of October, 1990

*Attest:*

HARRY F. MANBECK, JR.

*Attesting Officer*

*Commissioner of Patents and Trademarks*